United States Patent

Rosser et al.

[11] Patent Number: 5,808,695
[45] Date of Patent: Sep. 15, 1998

[54] METHOD OF TRACKING SCENE MOTION FOR LIVE VIDEO INSERTION SYSTEMS

[75] Inventors: Roy J. Rosser; Subhodev Das, both of Princeton; Yi Tan, Plainsboro, all of N.J.

[73] Assignee: Princeton Video Image, Inc., Lawrenceville, N.J.

[21] Appl. No.: 580,892

[22] Filed: Dec. 29, 1995

Related U.S. Application Data

[60] Provisional application No. 60/000,279 Jun. 16, 1995.

[51] Int. Cl.[6] .................................................. H04N 5/76
[52] U.S. Cl. ...................... 348/584; 348/135; 348/141; 348/169; 348/580; 348/589
[58] Field of Search .................................. 348/584, 586, 348/589, 580, 578, 135, 141, 169, 722; H04N 5/76

[56] References Cited

U.S. PATENT DOCUMENTS

| | | | |
|---|---|---|---|
| 4,084,184 | 4/1978 | Crain | 348/116 |
| 5,264,933 | 11/1993 | Rosser | 348/578 |
| 5,353,392 | 10/1994 | Luquet et al. | 348/578 |

FOREIGN PATENT DOCUMENTS

| PCT/ | | | |
|---|---|---|---|
| US9207498 | 9/1992 | WIPO | H04N 5/275 |

OTHER PUBLICATIONS

William K. Pratt, *Digital Image Processing*, pp. 653–658.

*Primary Examiner*—Tommy P. Chin
*Assistant Examiner*—Vu Le
*Attorney, Agent, or Firm*—Woodbridge & Associates

[57] ABSTRACT

A method for tracking motion from field to field in a sequence of related video broadcast images. The method uses template correlation to follow a set of predetermined landmarks within a scene in order to provide position information of objects in the current image. The current image object position information is compared to position information of the same objects within a reference array data table. The comparison is accomplished through the use of warp equations that map points in the current image to points in the reference array. Motion is tracked according to a velocity prediction scheme utilizing a weighted formula that emphasizes the weight of landmarks that are closer to their predicted position.

24 Claims, 6 Drawing Sheets

| ID | LEV | X | Y | TName | LxT | (Lmk ATTRIBUTES) |
|----|-----|---|---|-------|-----|------------------|
| 0 | 1 | 36.718 | 36.000 | vM7 | 9000 | v1 |
| 1 | 1 | 75.912 | 36.000 | vM7 | 9000 | v1 |
| 2 | 1 | 101.269 | 36.000 | vM7 | 9000 | v1 |
| 3 | 1 | 179.776 | 36.000 | vM7 | 9000 | v1 |
| 4 | 1 | 227.794 | 36.000 | vM7 | 9000 | v1 |
| 5 | 1 | 261.520 | 36.000 | vM7 | 9000 | v1 |
| 6 | 1 | 297.343 | 36.000 | vM7 | 9000 | v1 |
| 7 | 1 | 320.523 | 36.000 | vM7 | 9000 | v1 |
| 8 | 0 | 114.000 | 106.448 | hM1 | 6148 | h, |
| 9 | 0 | 179.000 | 106.716 | hM1 | 6148 | h, |
| 10 | 0 | 240.000 | 106.555 | hM1 | 6148 | h, |
| 11 | 0 | 310.000 | 106.747 | hM1 | 6148 | h, |
| 12 | 0 | 400.000 | 106.848 | hM1 | 6148 | h, |
| 13 | 0 | 480.000 | 106.724 | hM1 | 6148 | h, |
| 14 | 0 | 540.000 | 106.988 | hM1 | 6148 | h, |
| 15 | 0 | 619.000 | 107.580 | hM1 | 6148 | h, |
| 16 | 0 | 700.000 | 107.748 | hM1 | 6148 | h, |

31, 33

METHOD OF TRACKING SCENE MOTION FOR LIVE VIDEO INSERTION SYSTEMS

CROSS-REFERENCE TO RELATED APPLICATIONS

This patent application is related to, and claims the priority of U.S. Provisional patent application No. 60/000, 279 filed on Jun. 16, 1995 entitled "APPARATUS AND METHOD OF INSERTING IMAGES INTO TELEVISION DISPLAYS" and is related to U.S. patent application filed Nov. 28, 1995 entitled "SYSTEM AND METHOD FOR INSERTING STATIC AND DYNAMIC IMAGES INTO A LIVE VIDEO BROADCAST" and U.S. patent application No. 08/381,088 filed Jan. 31, 1995 entitled "LIVE VIDEO INSERTION SYSTEM" now U.S. Pat. No. 5,627,915.

BACKGROUND OF THE INVENTION

1. Field of the Invention

This invention relates to the improved performance of devices for inserting realistic indicia into video images.

2. Description of the Related Art

Electronic devices for inserting electronic images into live video signals, such as described in U.S. Pat. No. 5,264,933 by Rosser, et al., have been developed and used for the purpose of inserting advertising and other indicia into broadcast events, primarily sports events. These devices are capable of seamlessly and realistically incorporating logos or other indicia into the original video in real time, even as the original scene is zoomed, panned, or otherwise altered in size or perspective.

Making the inserted indicia look as if it is actually in the scene is an important but difficult aspect of implementing the technology. A troublesome aspect is that the eye of the average viewer is very sensitive to small changes in the relative position of objects from field to field. Experimentally, instances have been found where relative motion of an inserted logo by as little as one tenth of one pixel of an NTSC television image is perceptible to a viewer. Placing, and consistently maintaining to a high precision, an inserted indicia in a broadcast environment is crucial in making video insertion technology commercially viable. A broadcast environment includes image noise, the presence of sudden rapid camera motion, the sporadic occurrence of moving objects which may obscure a considerable fraction of the image, distortions in the image due to lens characteristics and changing light levels, induced either by natural conditions or by operator adjustment, and the vertical interlacing of television signals.

In the prior art, the automatic tracking of image motion has generally been performed by two different methods. The first method, described in U.S. Pat. No. 4,084,184 issued to D. W. Crain, uses sensors placed on the camera to provide focal distance, bearing and elevation information. The second method examined the image itself and either followed known landmarks in the video scene, using correlation or difference techniques, or calculated motion using well known techniques of optical flow. See, Horn, B. K. P. and Schunck, B. G., "Determining Optical Flow", *Artificial Intelligence,* pp 185–203 (1981). Landmarks may be transient or permanent and may be a natural part of the scene or introduced artificially. A change in shape and pose of the landmarks is measured and used to insert the required indicia.

The problem with the first method is twofold. First, it requires special cameras at the event thus limiting the situations in which live video insertion can be undertaken. Second, the desired precision can only be achieved with expensive equipment attached to each camera. As an example, a 1 in 7000 placement precision in a typical baseball scene covering about 7 meters of play and shot from 300 meters away requires a positional measurement of 3 micro-meters on a camera base of 1 meter.

The problems with the second method concern noise, image distortion and miss-recognition.

In field trials with televised baseball and football games, previous systems encountered the following specific, major problems.

1. Camera Motion

In a typical sport, such as football or baseball, close up shots are taken with long focal length cameras operating at a distance of up to several hundred yards from the action. Both of these sports have sudden action, namely the kicking or hitting of a ball, which results in the game changing abruptly from a tranquil scene to one of fast moving action. As the long focal length cameras react to this activity, the image they record displays several characteristics which render motion tracking more difficult. For example, the motion of the image may be as fast as ten pixels per field. This will fall outside the range of systems that examine pixel windows that are less than 10 by 10 pixels. Additionally, the images may become defocused and suffer severe motion blurring, such that a line which in a static image is a few pixels wide, blurs out to be 10 pixels wide. This means that a system tracking a narrow line, suddenly finds no match or makes assumptions such as the zoom has changed when in reality only fast panning has occurred. This motion blurring also causes changes in illumination level and color, as well as pattern texture, all of which can be problems for systems using pattern based image processing techniques. Camera motion, even in as little as two fields, results in abrupt image changes in the local and large scale geometry of an image. An image's illumination level and color are affected by camera motion as well.

2. Moving Objects

Sports scenes generally have a number of participants, whose general motion follows some degree of predictability, but who may at any time suddenly do something unexpected. This means that any automatic motion tracking of a real sports event has to be able to cope with sudden and unexpected occlusion of various parts of the image. In addition, the variety of uniforms and poses adopted by players in the course of a game, mean that attempts to follow any purely geometric pattern in the scene have to be able to cope with a large number of occurrences of similar patterns.

3. Lens Distortion

All practical camera lenses exhibit some degree of geometric lens distortion which changes the relative position of objects in an image as those objects move towards the edge of an image. When 1/10th of a pixel accuracy is required, this can cause problems.

4. Noise in the Signal

Real television signals exhibit noise, especially when the cameras are electronically boosted to cover low light level events, such as night time baseball. This noise wreaks havoc with image analysis techniques which rely on standard normalized correlation recognition, as these match pattern shapes, irrespective of the strength of the signal. Because noise shapes are random, in the course of several hundred thousand fields of video (or a typical three hour game), the chances of mistaking noise patterns for real patterns can be a major problem.

5. Field-to-Field Interlace

Television images, in both NTSC and PAL standards, are transmitted in two vertically interlaced fields which together make up a frame. This means that television is not a single stream of images, but two streams of closely related yet subtly different images. The problem is particularly noticeable in looking at narrow horizontal lines, which may be very evident in one field but not the other.

6. Illumination and Color Change

Outdoor games are especially prone to illumination and color changes. Typically, a summer night baseball game will start in bright sunlight and end in floodlight darkness. An illumination change of a factor of more than two is typical in such circumstances. In addition the change from natural to artificial lighting changes the color of the objects in view. For instance, at Joe Robbie Stadium in Florida, the walls appear blue under natural lighting but green under artificial lighting.

7. Setup Differences

Cameras tend to be set up with small but detectable differences from night to night. For instance, camera tilt typically varies by up to plus or minus 1%, which is not immediately obvious to the viewer. However, this represents plus or minus 7 pixels and can be a problem to typical templates measuring 8 pixels by 8 pixels.

The prior art contains a number of proposals for automatic motion tracking in video sequences.

Rosser et al., in U.S. Pat. No. 5,264,933, utilized well known methods of image processing, such as template correlation combined with pyramid techniques. See, "IEEE Proceedings", May 1979 and "Pattern Recognition & Image Processing", Vol 67, Num. 5, pp 705–880. It was thought that this would be sufficient for all field to field tracking of motion once the pattern had been recognized. This method works well in limited, controlled environments. However, such standard algorithms are insufficient for the demands of day to day broadcast environments and need to be improved upon for general, wide spread commercial use of video insertion systems. The present invention is an improvement over this prior technique.

Luquet et al., in U.S. Pat. No. 5,353,392, propose using either camera sensor information or landmarks in the scene, and relying on mathematical modeling filtered over time to eliminate uncertainties in either motion or position. However, this method presupposes an evolutionary image sequence with a high degree of correlation between each image. The abrupt changes in action of many major sports, and the subsequent abrupt and non-evolutionary changes in both camera and image parameters makes it unlikely that their algorithms will be successful in tracking through those abrupt changes which are often the moments of most interest to the viewer.

Hanna et al., in PCT application PCT/US92/07498 (Wo 93/06691), propose a two step approach to tracking in which a set of widely distributed set of landmarks are followed using normalized correlation on a Laplacian decimated pyramid of the video field. This coarse location is used as a guide for performing an affine precise alignment on a "locator pattern" within the image. The process is described in detail in "Hierarchical Model-Based Motion Estimation" in the Proc. European Conference on Computer Vision, 1992, pp 237–252, by Bergen et al. It uses an iterative process of calculating image flow by subtracting a reference locator pattern from the current location predicted by the course alignment. It then uses that image flow to warp the locator pattern to a more precise location. Although capable of very high accuracy, this method requires a starting point that is accurate to less than a pixel. Even then it is prone to error in the presence of noise or moving objects, therefore unsuited for day to day general use. One approach to locating landmarks in a scene employing dissimilar templates is described in our co-pending U.S. patent application No. 08/381,088 filed Jan. 31, 1995 entitled "Live Video Insertion System", the entire contents of which are incorporated herein by reference.

The problem addressed by the present invention is the difficulty of providing a robust yet high precision tracking algorithm capable of following motion in a stream of real, noisy video images, thereby enabling live video insertion systems capable of general commercial use.

SUMMARY OF THE INVENTION

The invention comprises an improved method for tracking motion from field to field in a sequence of related video images. Termed adaptive-geographic-hierarchical tracking with color based landmark occlusion, the method allows robust, high precision motion tracking in a stream of real, noisy video images.

The preferred method uses template correlation with zoom insensitive templates, such as edges, to follow a group of pre-designated landmarks or some subset of a group within a scene. Template correlation of landmarks provides raw position information used to follow the motion of a scene. Typically, the landmarks used may be parts of the structure in a ball park or markings on a field of play. Creating an ideal mathematical formulation of the scene to be tracked is a key part of the tracking algorithm. This ideal mathematical representation is referred to as the reference array and is simply a table of idealized x,y coordinate values. The images associated with the array are for operator convenience. Current images or scenes are related to this reference array by a set of warp parameters which define the mathematical transform that maps points in the current scene to the reference array. In the simple case in which rotation is ignored or kept constant the current image is mapped to the reference array by the following equations:

$$x'=a+bx$$

$$y'=d+by$$

where x' and y' are the coordinates of a landmark in the current scene, x and y are the coordinates of the same landmark in the reference array and b is the magnification between the reference array and the current scene, a is the translation in the x direction and d is the translation in the y direction between the reference array and the current scene.

The essence of adaptive, geographic hierarchical tracking is paying most attention to landmarks which are found at or close to their anticipated model derived positions.

The first step is to obtain an accurate velocity prediction scheme to locate the anticipated model derived position. Such a scheme estimates, via the warp parameters from the previous field or scene, where the landmarks in the current image should be. The primary difficulty with velocity prediction in interlaced video is that from field to field there appears to be a one pixel y component to the motion. The present invention handles this by using the position from the previous like field, and motion from the difference between the last two unlike fields.

Having predicted where in the current image the landmarks should be, template correlations over a 15 by 15 pixel region are then performed centered on this predicted position. These correlation patterns are then searched from the center outward looking for the first match that exceeds a threshold criteria. Moreover, each landmark has a weighting function whose value is inversely proportional to the distance the landmark is away from its anticipated model derived position. When calculating the new warp parameters for the current scene, each landmark's current position is used weighted by this function. This gives more emphasis to landmarks which are closer to their predicted positions. A further step, necessary to compensate for camera distortion as the scene moves, is to dynamically update the reference array coordinates of the landmarks based on their current locations. This updating is done only on good landmarks, and is itself heavily weighted by the distance error weighting function. This adaptive reference array allows very accurate tracking of landmarks even as they pass through lens and perspective distortions. The danger in having an adaptive reference array is that it may get contaminated. This danger is mitigated by having three sets of reference coordinates, which are referred to as the code, game and tracking reference coordinates. When the system is initially loaded, the code reference coordinates are set to the original reference coordinates. The game and tracking coordinates are initially set equal to the code reference coordinates. Once the system locates a scene and begins tracking, the tracking coordinates are used. However, each time a scene cut occurs, the tracking coordinates are automatically reset to the game reference coordinates. At any time the operator may choose to set the current tracking coordinates equal to the game reference coordinates or to set the game reference coordinates back to the code reference coordinates. This scheme allows for adaptive reference updating with operator override capability.

The final element in the tracking scheme is a method of determining when a landmark is obscured by some object, so as to avoid spurious data in the system. A color based occlusion method is used in which a set of sensor points in a pattern around where a landmark is found are examined and if they are found to differ from the colors expected in those regions, the landmark is deemed to be occluded and not used in further calculations. The sensor points from good landmarks are used to update the reference values for expected colors of the sensor points so that the system can accommodate changing conditions such as the gradual shift from sunlight to artificial light during the course of a broadcast.

This strategy of adaptive, hierarchical tracking has proved to be a means of high precision and robust tracking of landmarks within video sequences even in the noisy, real world environment of live broadcast television.

DETAILED DESCRIPTION OF THE PREFERRED EMBODIMENT

During the course of this description like numbers will be used to identify like elements according to the different figures which illustrate the invention.

Adaptive-geographic-hierarchical tracking with color based occlusion is a method which allows for the robust, high precision tracking of motion from field-to-field in a sequence of related video images in the presence of noise as experienced in a typical broadcast. As its name suggests, there are several parts to the method. To understand the invention, it is easiest to take component parts and look at each in turn.

The reason for doing motion tracking is to allow the electronic insertion of images into live video signals so that they appear to be part of the original scene, primarily for the purposes of advertising, even when the camera zooms, pans, tilts, or otherwise alters the appearance of the scene in size or perspective, as described in U.S. Pat. No. 5,264,933 by Rosser et al.

Figure 1:
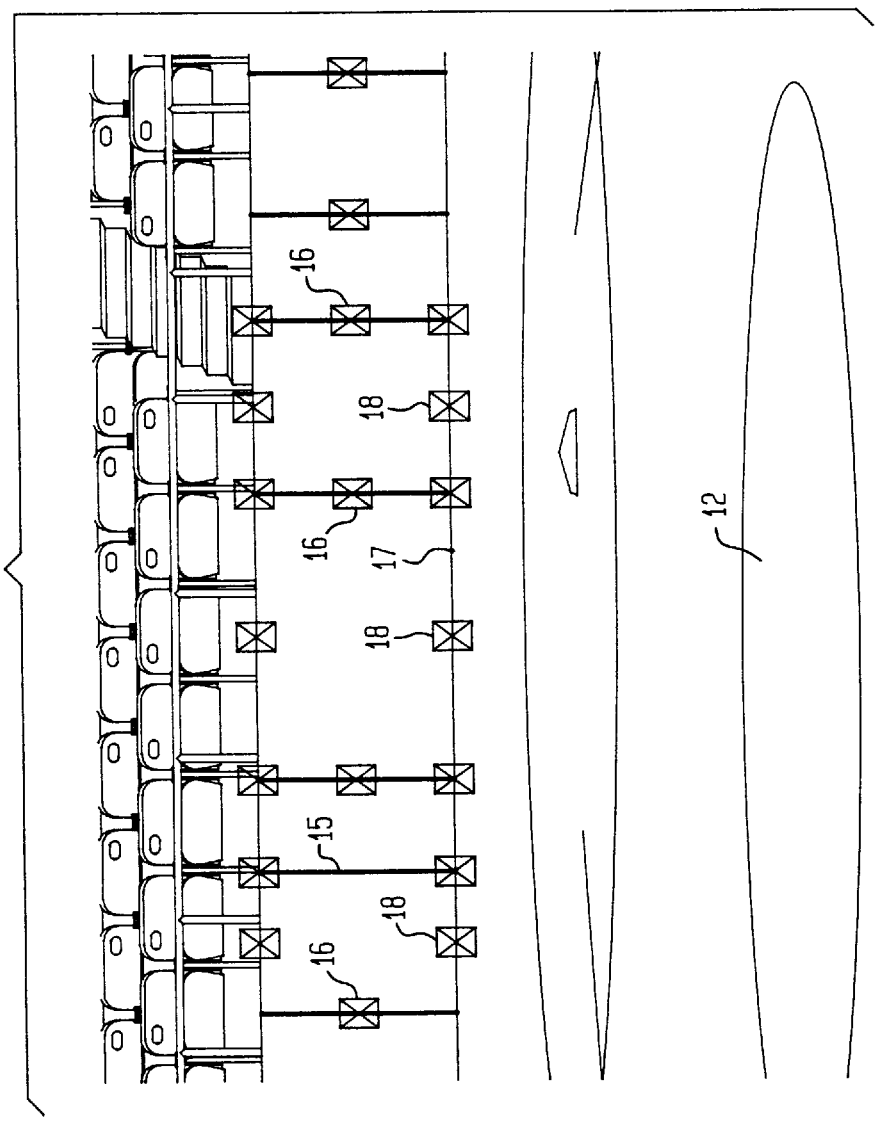
FIG. 1 is a schematic representation showing a reference video image of a scene.
Figure 2:
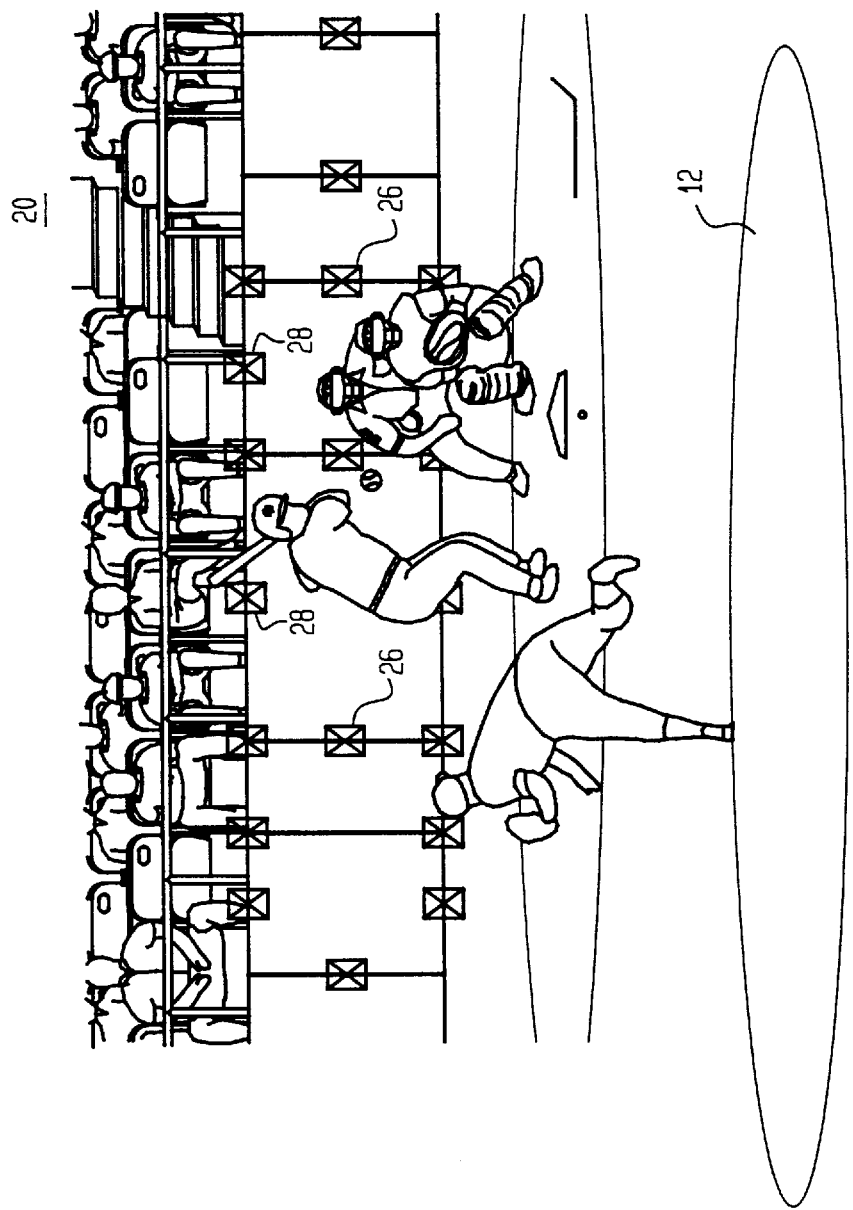
FIG. 2 is a schematic representation showing a live video image of the reference video image in FIG. 1.
Figures 3, 4:
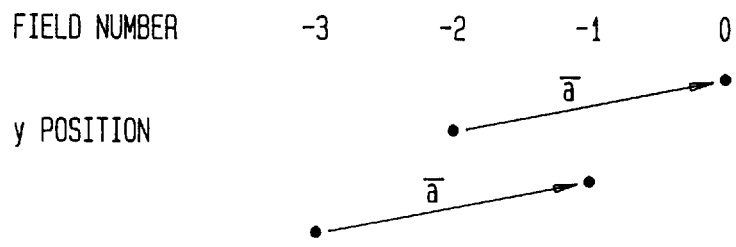
FIG. 3 is a table illustrating the elements of a typical representation of a reference array.
FIG. 4 is illustrates a schematic representation of field number versus y image position in an interlace video field.

Referring to FIG. 1, motion tracking of video images which allow seamless insertion as practiced by this invention, starts with a reference array 10 of a scene in which insertions are to be placed. Although having an actual image is a useful mental aid, this reference array is nothing more than a set of idealized x,y coordinate values which represent the position of a number of key landmark sets 16 and 18 within reference array 10. A typical table is shown in FIG. 3, illustrating the listing of x, or horizontal coordinates 31, and the y, or vertical coordinate positions 33. The positions 31 and 33 of key landmark sets 16 and 18 are used both as references against which motion can be measured and in relation to which insertions can be positioned. A typical reference array 10 of a baseball scene from a center field camera will consist of the locations of features such as the pitcher's mound 12, the back wall 14, vertical lines 15 between the pads which make up the back wall 14, and the horizontal line 17 between the back wall and the field of play on which the horizontal set of landmarks 18 are set.

The current image or scene 20 is the field from a video sequence which is presently being considered. Locations of key features or landmark sets 16 and 18 from reference array 10 also are indicated in current image 20 as measured positions 26 and 28. Measured positions 26 and 28 are related to corresponding reference array landmark locations from sets 16 and 18 by a set of warp parameters which define a mathematical transform that most accurately maps the position of points in current image 20 to the position of points in reference array 10. Such mappings are well known mathematically. See, "Geometrical Image Modification in Digital Image Processing", W. K. Pratt 2nd Edition, 1991, John Wiley and Sons, ISBN 0-471-85766.

Tracking the view from a fixed television camera, especially one with a reasonably long focal length as in most sporting events, can be thought of as mapping one two-dimensional surface to another two-dimensional surface. A general mathematical transform that accomplishes such a mapping allowing for image to image translation, zoom, shear, and rotation is given by the following six parameter model.

$$x' = a + bx + cy$$

$$y' = d + ex + fy$$

where x and y are coordinates in reference array 10, x' and y' are the transformed coordinates in current image 20, a is the image translation in the x direction, b is the image magnification in the x direction, c is a combination of the rotation, and skew in the x direction, d is the image translation in the y direction, e is a combination of the rotation, and skew in the y direction, and f is the image magnification in the y direction.

The tracking algorithms and methods discussed herein can be used with the above transformation as well as other more general transformations. However, experience has shown that with a dynamically updated reference array, a simpler x,y mapping function which assumes no shear or rotation will suffice. Thus, in the simple case in which rotation is ignored or kept constant (c=e=0) and the magnification in the x and y directions is the same (b=f) the position of points in current image 20 are mapped to the position of points in reference array 10 using the following equations:

$$x' = a + bx$$

$$y' = d + by$$

where x' and y' are coordinates of a landmark in current image 20, x and y are coordinates of the same landmark in reference array 10, b is the magnification between reference array 10 and current image 20, a is the translation in the x direction, and d is the translation in the y direction. This simplified mapping scheme is used because experience has shown it to be both robust and capable of handling the limited shear, rotation, and perspective distortion present in television sports broadcasts when a dynamically updated reference array is used.

Motion tracking is the method of measuring positions of landmark sets 26 and 28 in current image 20 and using these measurements to calculate the warp parameters a, d and b, as defined by the equations above. An important part of adaptive geographic hierarchical tracking is the concept of assigning a weight to each landmark. Weights are assigned, in inverse proportion, according to the distance each landmark is detected away from where it is expected or predicted to be found. The closer a landmark is found to where it is predicted to be, the greater the weight given to that landmark in the calculation of the warp parameters linking the positions in current image 20 to the positions in reference array 10.

The first step is predicting where the landmarks 26 and 28 should be in current image 20. This is done by analyzing the landmark positions in the three previous fields. The previous position and velocity of a landmark derived from the previous model is used to estimate where the landmark will appear in the current image 20. The position and velocity calculations are complex in that both the current standard methods of television transmission, NTSC and PAL, are sent in two vertically interlaced fields. Thus, alternate horizontal scans are included in separate fields, customarily referred to as odd and even fields. In the NTSC system, each field is sent in 1/60th of a second (16.6 msecs), making a combined single frame every 1/30th of a second.

One important practical consideration in the velocity estimations is that the x and the y positions in the previous fields (−1, −2 and −3) that are used in the velocity estimations are not the measured positions, but the positions calculated using the final warp parameters derived in each of those fields. That is, in each field, x and y positions are measured for each landmark. All of the landmarks are then used to derive a single set of warp parameters a, b and d giving the mapping between the current and the reference array. That single set of warp parameters is then used to project the reference array coordinates 10 into the current image 20, giving an idealized set of landmark positions in the current image. It is this idealized set of landmark positions in each field, referred to as the model derived positions, that are used in the velocity predictions.

As illustrated in FIG. 4, the current y or vertical position of a landmark is predicted from the previous three fields. The y position in the current field (field 0) is predicted by measuring the y component of velocity as the difference between the landmark's model derived position in field −1 and field −3, which are "like" fields in that they are both either odd or even. The y velocity component is then added to the model derived y position in field −2, which is the previous field "like" the current field, to arrive at an estimate of where to find that landmark in the current field.

The prediction in the x direction could use the same algorithm or, since there is no interlace, the x direction calculation can be simpler and slightly more current. In the simpler scheme, the x component of the velocity is calculated as the difference between the landmark's model derived position in field −1 and its model derived position in field −2. This difference is then added to the model derived position in field −1 to arrive at an estimate of where to find that landmark in the current field.

Figure 5A:
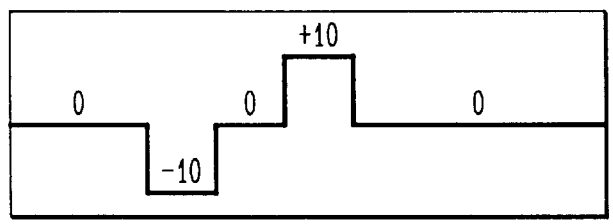
FIG. 5a illustrates a cross-sectional view of zero mean edge template.
Figure 5B:
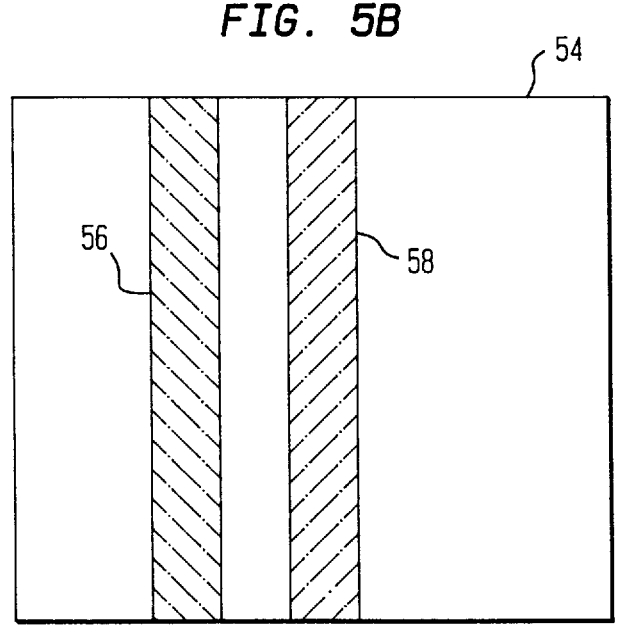
FIG. 5b illustrates a plan view of a zero mean edge template

Having predicted the most likely position of all the landmarks in the current image, the positions of the landmarks are then found by doing a correlation of an 8 by 8 pixel template over a 15 by 15 pixel region centered at the predicted position. Correlation or template matching is a well known technique, and in its standard form is one of the most fundamental means of object detection. See, Chapter 20, "Image Detection and Recognition of Digital Image Processing" by W. K. Pratt (2nd Edition, 1991, John Wiley and Sons, ISBN 0-471-85766). Unlike more standard methods of correlation or template matching in which the template is made to closely resemble the part of the scene it is being used to find, the templates in the present invention are synthetic, idealized both in shape and value, and are "zero-mean". For instance, in tracking a football goal post upright, rather than use a portion of the goal post taken from the image, the template 54 used is an edge of uniform value made from a negative directed line 56 and a positive directed line 58, and the sum of the values in the 8 by 8 template is equal to zero as shown schematically in cross-section in FIG. 5a and in plan view in FIG. 5b. This template has the advantages of being zoom independent and will give a zero value on a surface of uniform brightness. The technique is not limited to 8 by 8 pixel templates, nor is the region over which they are correlated limited to 15 by 15 pixel regions. Further, this technique is not limited to zero mean templates either. In circumstances where only vertical and horizontal lines and edges are being tracked it is possible to reduce computation by having (1×n) correlation surfaces for following the horizontal detail, and (n×1) correlation surfaces for following the vertical detail where n is any reasonable number, usually in the range of 5–50 pixels.

Figure 6:
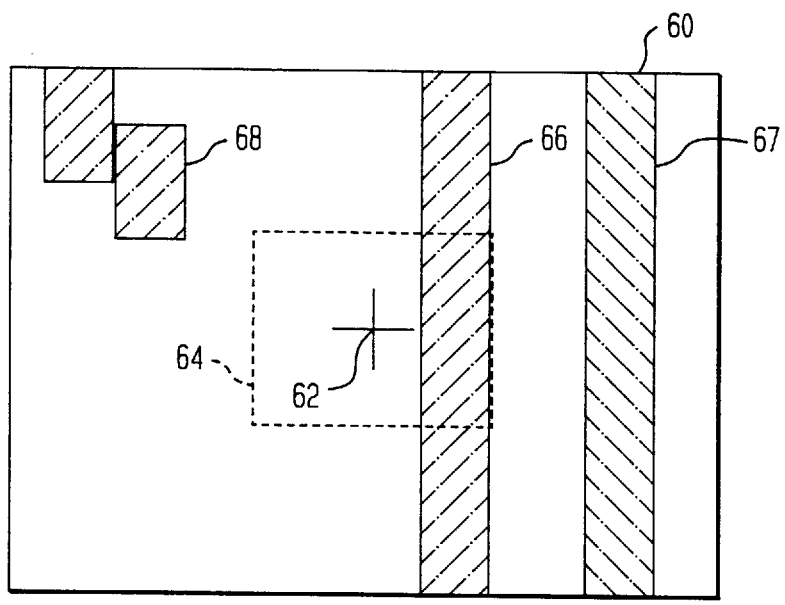
FIG. 6 illustrates a correlation surface.

The idealized, zero-mean edge template 54 is correlated over a 15 by 15 pixel region of the current image or some amplified, filtered and decimated replica of it to produce a correlation surface 60 as shown schematically in FIG. 6. This correlation surface 60 consists of a 15 by 15 array of pixels whose brightness correspond to the correlation of the image against the template when centered at that position. Typically, an edge template 54 correlated over a region of an image containing a line will give both a positive going line response 66, indicating a good match and a corresponding negative going line 67 indicating a mismatch. This mismatch line 67 can be useful in that its position and distance away from the positive going match line 66 give a measure of the width of the line and whether it is brighter or darker than its surroundings. In addition, there will be other bright pixels 68 on the correlation surface 60 corresponding to bright edge like features in the current image.

A guiding principle of the adaptive-geographic-hierarchical tracking method is to focus on landmarks and the correlation peaks indicating potential landmarks that are closest to where they are expected to be. Rather than just looking for a peak anywhere on the 15 by 15 correlation surface 60, these patterns are searched from the center outward. The simplest, and very effective, way of doing this is to first look at the central nine pixel values in the central 3 by 3 pixel region 64. If any of these pixels has a correlation value greater than a threshold then it is assumed that the pixel represents the landmark being sought and no further investigation of the correlation surface is done. The threshold is usually fifty percent of the usual landmark correlation anticipated. This 3 by 3 initial search allows motion tracking even in the presence of nearby objects that by their brightness or shape might confuse the landmark correlation, such as when the pixel marked 68 had been brighter than the pixels in the line 66. Once the pixel with the peak brightness is found, an estimate of the sub pixel position is found using the well known method of reconstructing a triangle as discussed in co-pending U.S. patent appliation No. 08/381,088. There are other sub pixel position estimating methods that may be used such as fitting higher order curves to the data. However, experience has shown that the triangular method described in co-pending U.S. patent applicaiton No. 08/381,088 to be most effective.

An alternative method is to multiply the correlation surface by a function which gives greater weight to pixels at the center. This weighting function may have any shape, though we have found "top-hat" and Guassian like shapes to be most effective. This new weighted surface is then searched for peak values and these are used to give the location at which the subpixel estimates are based. When using the weighted surface for finding peaks, it is still necessary to use the unweighted correlation surface for subpixel peak estimation using the method of completing the triangle as described in co-pending U.S. patent application No. 08/381,088 or other like algorithms. It is also important to check that the peak from the weighted surface is in fact a local peak on the unweighted surface before doing the interpolation. If it is not then no interpolation is performed and the uninterpolated value is used.

Figure 7:
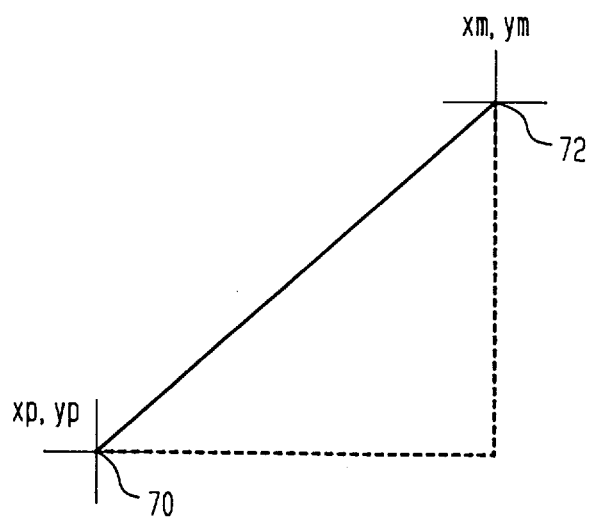
FIG. 7 illustrates a measured and predicted position on a surface.

In addition, each landmark found in a scene has an error weight associated with it based on its distance from where it is expected to be. Referring now to FIG. 7, the calculation of this error weight is based on the predicted position in the image 70, at the coordinates xp, yp and the measured position in the image 72, at the coordinates xm, ym, using the general equation:

$$ErrorWeight = \frac{g}{h + (i((xp - xm)^j + (yp - ym)^k))^l}$$

where g, h, i, j, k, and l are numerical constants chosen to vary the strength of the weighting function.

In the preferred embodiment the parameters of the equation are:

$$ErrorWeight = \frac{1.0}{1.0 + ((xp - xm)^2 + (yp - ym)^2)^{1.0}}$$

although in special circumstances, each of the parameters might have a different value to change the emphasis of the weighting. For instance, numerical constants i and j may be varied to provide a function which stays constant for a short distance and then drops rapidly.

This error weight is then used in the calculation of the warp parameters which maps points in the current image 20 to the positions in the reference array 20. In the preferred embodiment this calculation is a weighted least mean squares fit using the following matrix:

$$\begin{bmatrix} \Sigma(C1 \cdot C1) & \Sigma(nx \cdot C1) & \Sigma(ny \cdot C1) \\ \Sigma(nx \cdot C1) & \Sigma(nx \cdot nx) & \Sigma(nx \cdot ny) \\ \Sigma(ny \cdot C1) & \Sigma(nx \cdot ny) & \Sigma(ny \cdot ny) \end{bmatrix} \begin{bmatrix} b \\ a \\ d \end{bmatrix} = \begin{bmatrix} \Sigma(C1 \cdot C2) \\ \Sigma(nx \cdot C2) \\ \Sigma(ny \cdot C2) \end{bmatrix}$$

where $C1 = nx \cdot ErrorWeight \cdot xp + ny \cdot ErrorWeight \cdot yp$ and $C2 = nx \cdot ErrorWeight \cdot xm + ny \cdot ErrorWeight \cdot ym$ In the case of purely horizontal landmarks, nx=0 and ny=1 and in the case of purely vertical landmarks nx=1 and ny=0. In the more general case, nx and ny are the direction cosines of vectors representing the normal to the landmarks predominant direction.

The adaptive part of the motion tracking scheme is necessary to allow for camera distortion. It also allows the system to compensate for small discrepancies between the stored idealized reference array and the actual scene as well as allowing the system to handle small slow rotation and/or shear. It further allows the system to handle any small and slowly occurring distortions. This adaptation is done by dynamically updating the reference array coordinates based on their current locations. In the present invention the adaptive part of the motion tracking is made stable by the following criteria: 1) being very careful when it is allowed to occur; 2) choosing which landmarks are allowed to participate based on how confident the system is that said landmarks are good; and 3) having the whole calculation heavily weighted by the distance error weighting function. In addition, the reference array is reset after any scene cuts.

In the preferred embodiment the dynamic updating of the reference coordinates is started after six fields of tracking and is only done on landmarks which have not been flagged by any occlusion checks and have correlation values greater than 20% and less than 200% of expected reference values, though different values may be used for all these parameters.

The measured landmark positions are back projected to the positions in the reference array using the warp parameters calculated by all the good landmarks in the current field using the equations;

$$Xnr = (Xm-a)/b$$

$$Ynr = (Ym-d)b$$

$$Xr = X0r + (\text{ErrorWeight})^2 \cdot (Xnr - X0r)$$

$$Yr = Y0r + (\text{ErrorWeight})^2 \cdot (Ynr - Y0r)$$

where:
  Xm is the measured x coordinate of the landmark,
  Ym is the measured y coordinate of the landmark,
  a is the horizontal translation warp parameter,
  d is the vertical translation warp parameter,
  b is the magnification warp parameter,
  Xnr is the calculated x coordinate of a proposed new reference point based on this field's data,
  Ynr is the calculated y coordinate of a proposed new reference point based on this field's data,
  X0r is the x coordinate of the old reference point prior to update,
  Y0r is the y coordinate of the old reference point prior to update,
  Xr is the x coordinate put into the table as the new reference point, and
  Yr is the y coordinate put into the table as the new reference point.

It is also possible to use separate tracking reference arrays for odd and even fields to improve the tracking performance with interlace video. Because of the potentially unstable nature of the adaptive reference array, the preferred embodiment has three related reference arrays, referred to as the:

CODE REFERENCE
  GAME REFERENCE, and
  TRACKING REFERENCE

Figure 8:
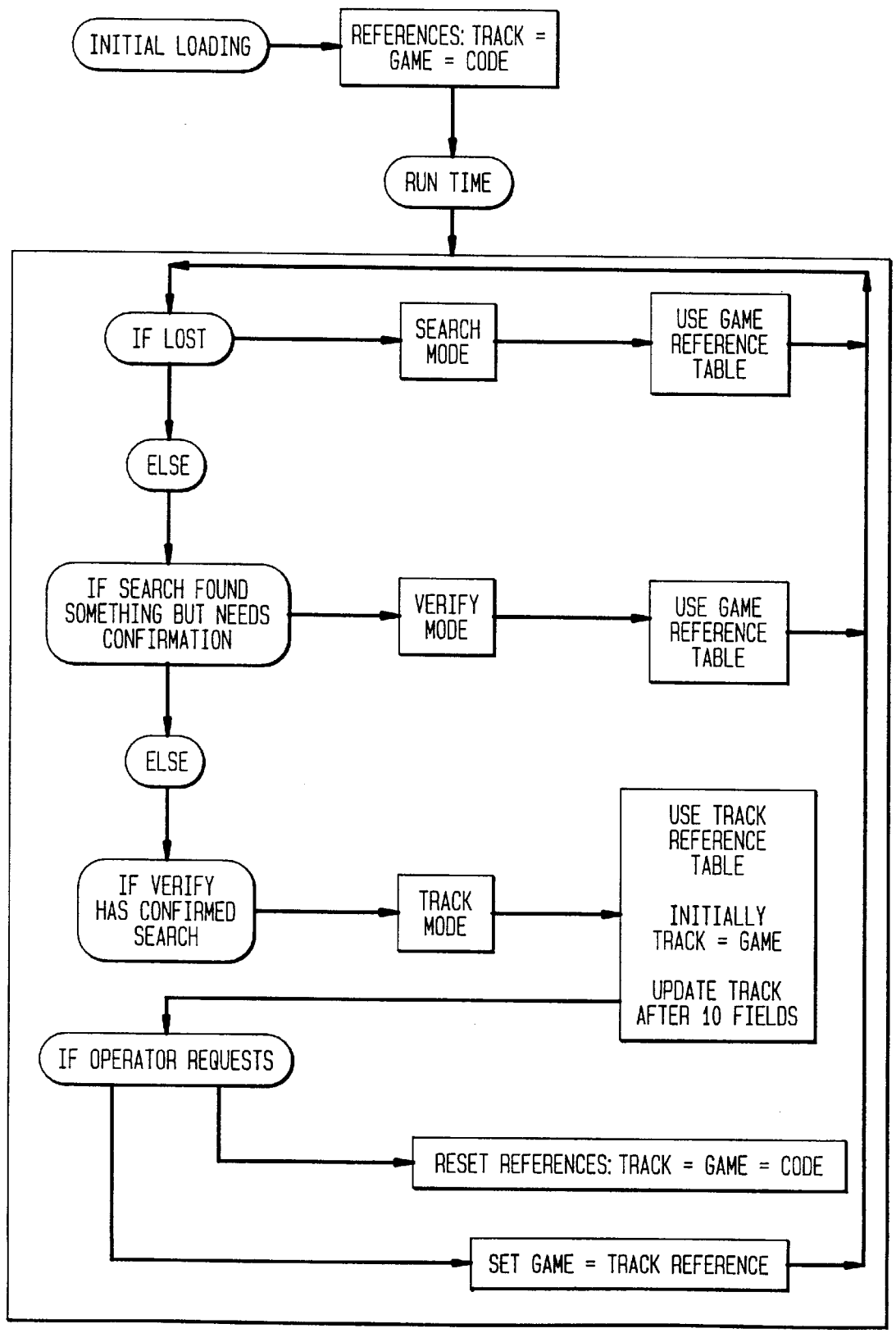
FIG. 8 illustrates a schematic flow diagram of how a track, reference, and code hierarchy of reference arrays is used to manage an adaptive reference array.

The schematic flow diagram in FIG. 8 illustrates how these three references are used. At start up, when the initial system is loaded, all three references are set to be the same

CODE REFERENCE=GAME REFERENCE=TRACKING REFERENCE which is to say that the x and the y coordinates of the landmarks in each of the reference arrays are set to be the same as the coordinates of the landmarks in the code reference array.

At run time, when the image processing is done, the three reference arrays are used in the following manner. The game reference is used in search and verify mode and in tracking mode the tracking reference is used.

Initially the tracking reference array is set equal to the game reference array. In the preferred embodiment this occurs on the first field in which the tracking is done. In subsequent fields the tracking reference is modified as detailed above. If separate tracking reference arrays are being used for odd and even fields they would both initially be set to the game reference array.

At any time during the tracking mode, the operator may elect to copy the current tracking references into the game reference using standard computer interface tools such as a screen, keyboard, mouse, graphic user interface, trackball, touch screen or a combination of such devices. This function is useful at the start of a game. For instance, an operator may be setting up the live video insertion system to perform insertions at a particular stadium. The code reference coordinates have landmark positions based on a previous game at that stadium but the position of the landmarks may have been subtly altered in the intervening time. The code reference, however, remains good enough for search and tracking most of the time. Alternatively, by waiting for a shot, or having the director set one up prior to the game, in which all the landmarks are clear of obstruction, and allowing for the adjustment of the tracking reference to be completed, a more accurate game reference for that particular game can be achieved.

At any time, in either the tracking or search mode, the operator can elect to reset the game reference to the code reference. This allows recovery from operator error in resetting the game reference to a corrupted tracking reference.

Figure 9:
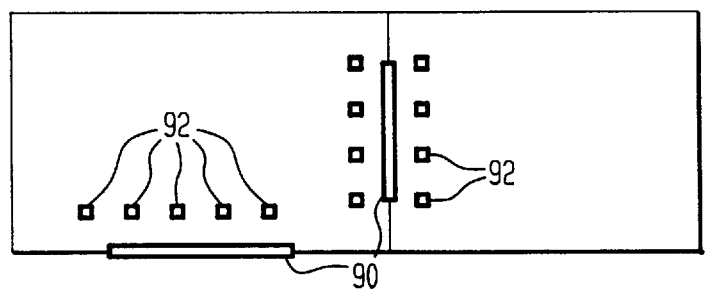
FIG. 9 illustrates a schematic view of landmarks and their associated sensor points used for color based occlusion.

An important part of the adaptive reference process is restricting the updating to landmarks which are known to be un-occluded by objects such as players. The method used for this landmark occlusion detection in the preferred embodiment is color based and takes advantage of the fact that most sports are played on surfaces which have well defined areas of fairly uniform color, or in stadiums which have substantial features of uniform color, such as the back wall in a baseball stadium. Each landmark 90 as shown in FIG. 9, has sensor points 92 associated with it. These sensor points 92, which in the preferred embodiment vary from 3 to 9 sensor points per landmark 90, are pixels in predetermined locations close to, or preferably surrounding the landmark they are associated with. More importantly, the sensor points are all on areas of reasonably uniform color. The decision on whether the landmarks are occluded or not is based on looking at the sensor points and measuring their deviation from an average value. If this deviation exceeds a pre-set value, the landmark is presumed to be occluded. Otherwise it is available for use in other calculations, such as the model calculations and the reference array updating.

Both the method of dealing with vertical interlace and the use of idealized landmark positions in each of the previous fields are vital and innovative.

The present invention possesses several advantages over the prior art known to applicant.

First, the present invention is more robust than any of the known prior art systems in that it is capable of tracking motion from field-to-field in a typical broadcast environment while maintaining a high precision of accuracy.

Second, the present invention is able to handle abrupt changes within a sequence of images smoothly. Such changes indicate events like fast action or a scene cut and are often of the most interest to a viewer.

Third, the present invention does not rely on sensor data from the camera itself. Thus, the invention is impervious to camera jitter or motion during a broadcast.

Fourth, since only the video image is used, the system can be located anywhere in the broadcast stream between the event and the viewer.

Finally, the present invention can achieve reliable results without requiring preprocessing or a starting point accurate to less than a pixel.

While the invention has been described with reference to the preferred embodiment thereof, it will be appreciated by those of ordinary skill in the art that various modifications can be made to the structure and function of the individual parts of the system without departing from the spirit and scope of the invention as a whole.

We claim:

1. A method for tracking motion from field to field with sub-pixel precision in a sequence of related video images having odd and even interlaced fields, the method comprising the steps of:
   a) establishing an array of idealized x and y coordinates representing a reference array having a plurality of landmarks where each landmark has unique x and y coordinates;
   b) detecting the positions x and y of the visible sub-set of the reference array landmarks in the current image;
   c) predicting the location, x' and y', of said visible sub-set of landmarks in the next video field with sub-pixel precision by using the detected positions of said landmark in the current and the two preceding video fields,
   wherein prediction errors due to interlace differences in the video images are minimized without creating two separate streams of prediction data, by using the position of the landmark found in the previous video field and adding to that the difference vector equal to the measured difference in said landmark's position in the current field and said landmark's position in the video two fields ago; and,
   d. mapping x and y coordinates in a current image to said x and y coordinates in said reference array using a calculated difference between the predicted location of the visible sub-set of landmarks in the current field, which was predicted in step (c) from the previous video field, and the detected positions of corresponding landmarks of the visible sub-set in the current field to thereby weight each detected landmark's contribution to the mapping function.

2. A system for tracking motion from field to field with sub-pixel precision in a sequence of related video images having odd and even interlaced fields comprising:
   a) scanning means for establishing an array of idealized x and y coordinates representing a reference array having a plurality of landmarks where each landmark has unique x and y coordinates;
   b) detecting means for detecting the positions x and y of the visible sub-set of the reference array landmarks in the current image;
   c) predicting means for predicting the location, x' and y', of said visible sub-set of landmarks in the next video field with sub-pixel precision by using the detected positions of said landmark in the current and the two preceding video fields,
   wherein prediction errors due to interlace differences in the video images are minimized without creating two separate streams of prediction data, by using the position of the landmark found in the previous video field and adding to that the difference vector equal to the measured difference in said landmark's position in the current field and said landmark's position in the video two fields ago; and,
   d. mapping means for mapping x and y coordinates in a current image to said x and y coordinates in said reference array using a calculated difference between the predicted location of the visible sub-set of landmarks in the current field, which was predicted in step (c) from the previous video field, and the detected positions of corresponding landmarks of the visible sub-set in the current field to thereby weight each detected landmark's contribution to the mapping function.

3. A method for tracking motion from field to field in a sequence of related video images having odd and even interlaced fields, the method comprising the steps of:
   a) establishing an array of idealized x and y coordinates representing a reference array having a plurality of landmarks where each landmark has unique x and y coordinates;
   b) mapping x and y coordinates in a current image to said x and y coordinates in said reference array, where said mapping is achieved according to the following relationships:

$$x'=a+bx+cy$$
   $$y'=d+ex+fy$$

where:
   x is a horizontal coordinate in the reference array,
   y is a vertical coordinate in the reference array,
   x' is a horizontal coordinate in the current scene,
   y' is a vertical coordinate in the current scene,
   a is a warp parameter for horizontal translation of the object in the x direction,
   b is a warp parameter for magnification between the reference array and the current image in the x direction,
   c is a warp parameter for a combination of rotation and skew in the x direction,
   d is a warp parameter for vertical translation of the object in the y direction,
   e is a warp parameter for a combination of rotation and skew in the y direction, and
   f is a warp parameter for magnification between the reference array and the current image in the y direction; and,
   c) predicting the future location of said landmark coordinates, x' and y', based on a detected change of position of said landmark from the previous field,
   wherein prediction errors due to interlace differences in the video images are minimized by using the position of the landmark found in the previous video field adjusted by the difference in position of the same landmark in the two preceding fields.

4. The method of claim 3 wherein said video images are vertically interlaced where images from field to field alternate between even and odd fields; in which two even fields are defined to be like fields, two odd fields are defined to be like fields, and an even field associated with an odd field are defined to be unlike fields.

5. The method of claim 4 wherein said predicting the future location of said landmark coordinates, x' and y', for said interlaced video images is based on a detected change of position of said landmark from the previous like field.

6. The method of claim 5 further comprising the steps of:
   d) searching for one of said landmarks in said current image by means of correlation using a template where the search is conducted over a substantial region spanning the predicted location of said landmark;
   e) multiplying the results of said correlation search in step (d) by a weighting function giving greater weight to correlations closer in distance to the predicted location of said landmark to yield a weighted correlation surface;
   f) searching said weighted correlation surface for its peak value.

7. The method of claim 5 further comprising the steps of:
   g) determining new warp parameters a,b,c,d,e and f for a current image based on said landmark's current position in a current image weighted by said weighting function for that landmark, wherein emphasis is given to landmarks which are closer to their predicted position.

8. The method of claim 7 wherein said weighting function comprises the following relationship:

$$ErrorWeight = \frac{g}{h + (i((xp - xm)^j + (yp - ym)^k))^l}$$

where:

g,h,i,j,k, and l are numerical constants;

xp is the predicted x coordinate location of said landmark;

xm is the measured x coordinate position of said landmark;

yp is the predicted y coordinate location of said landmark; and, ym is the measured y coordinate position of said landmark.

9. The method of claim 8 further including the step of:

h) updating said landmark locations in said reference array according to the location of said landmarks in said current image, wherein said updating is performed based upon well identified landmarks and according to said landmark weighting function.

10. The method of claim 9 further comprising the step of i) establishing three types of reference arrays prior to broadcast including;

i) a code reference array having landmark coordinates equal to said reference landmark coordinates, ii) a game reference array having landmark coordinates initially set equal to said code reference array coordinates, and, iii) a tracking reference array having landmark coordinates initially set equal to said code reference array coordinates.

11. The method of claim 10 further comprising the steps of:

j) changing said tracking reference array of coordinates during a broadcast; and, k) resetting the tracking reference array of coordinates to said game reference array of coordinates after a scene cut.

12. The method of claim 11 wherein said video system is controlled by an operator and said method further comprises the step of:

l) selectively choosing to set said current tracking reference array of coordinates equal to said game reference array of coordinates or to set said game reference array of coordinates back to said code reference array of coordinates, wherein said operator can update or override the game or tracking reference array of coordinates.

13. The method of claim 12 further comprising the steps of:

m) establishing a set of sensor points in a pattern around the location of each said landmark said sensor points being able to detect changes in color and illumination;

n) determining if said sensor points are different in color or illumination from the expected color or illumination; and, o) excluding said landmark from future calculations if said color or illumination is substantially different from what was expected, wherein said landmark is deemed to be occluded if said color or illumination at said sensor points is substantially different from the expected color or illumination.

14. The method of claim 13 wherein said correlation template is a 15 by 15 pixel window.

15. The method of claim 7 wherein said weighting function comprises the following relationship:

$$ErrorWeight = \frac{1.0}{1.0 + ((xp - xm)^2 + (yp - ym)^2)^{1.0}}$$

where:

xp is the predicted x coordinate location of said landmark;

xm is the measured x coordinate position of said landmark;

yp is the predicted y coordinate location of said landmark; and, ym is the measured y coordinate position of said landmark.

16. The method of claim 5 further comprising the steps of:

p) searching for one of said landmarks in said current image by means of correlation using a template where the starting point of the search is substantially centered at the predicted location of said landmark;

q) performing said search beginning from said predicted location and proceeding outward looking for a match; and, r) discontinuing said search for said landmark when said match exceeds a threshold value.

17. A method for tracking motion from field to field in a sequence of related video images having odd and even interlaced fields, the method comprising the steps of:

a) establishing an array of idealized x and y coordinates representing a reference array having a plurality of landmarks where each landmark has unique x and y coordinates;

b) mapping x and y coordinates in a current image to said x and y coordinates in said reference array, where said mapping is achieved according to the following relationships:

$$x'=a+bx$$
$$y'=d+by$$

where:

x is a horizontal coordinate in the reference array, y is a vertical coordinate in the reference array, x' is a horizontal coordinate in the current scene, y' is a vertical coordinate in the current scene, a is a warp parameter for horizontal translation of the object in the x direction, b is a warp parameter for magnification between the reference array and the current image, and, d is a warp parameter for vertical translation of the object in the y direction; and, c) predicting the future location of said landmark coordinates, x' and y', based on a detected change of position of said landmark from the previous field, wherein prediction errors due to interlace differences in the video images are minimized by using the position of the landmark found in the previous video field adjusted by the difference in position of the same landmark in the two preceding fields.

18. A system for tracking motion from field to field in a sequence of related video images having like and unlike interlaced fields comprising:

scanning means for establishing an array of idealized x and y coordinates representing a reference array having a plurality of landmarks where each landmark has unique x and y coordinates;

mapping means for mapping x and y coordinates in a current image to said x and y coordinates in said reference array; and, predicting means for predicting the future location of said landmark coordinates, x' and y', based on a detected change of position of said landmark from the previous field, wherein prediction errors due to interlace differences in the video images are minimized by using the position of the landmark found in the previous video field adjusted by the difference in position of the same landmark in the two preceding fields; and, searching means for searching for one of said landmarks in said current image with a correlation template substantially centered at the predicted location of said landmark wherein said search is performed beginning from said predicted location and proceeding outward looking for a match and discontinued when said match exceeds a threshold value.

19. The system of claim 18 further comprising:

weighting means for assigning each landmark a weighting function whose value is inversely proportional to the distance away said landmark is from its predicted position.

20. The system of claim 19 further comprising:

updating means for updating said landmark locations in said reference array according to the location of said landmarks in said current image wherein said updating is performed based upon well identified landmarks and according to said landmark weighting function.

21. The system of claim 20 further comprising:

means for establishing three types of reference arrays prior to broadcast including;

i) a code reference array having landmark coordinates equal to said reference landmark coordinates, ii) a game reference array having landmark coordinates initially set equal to said code reference array of coordinates, and, iii) a tracking reference array having landmark coordinates initially set equal to said code reference array of coordinates.

22. The system of claim 21 further comprising:

operator input means for changing said tracking reference array of coordinates during a broadcast and resetting the tracking reference array of coordinates to said game reference array of coordinates after a scene cut.

23. The system of claim 22 further comprising:

sensor means for establishing a set of sensor points in a pattern around the location of each landmark wherein said sensor points are able to detect changes in color and illumination for determining if said sensor points are different in color or illumination from the expected color or illumination.

24. The system of claim 23 further comprising:

occlusion means for excluding a landmark from future calculations if said color or illumination around said landmark is substantially different from what was expected.

* * * * *